United States Patent [19]

Mann

[11] 4,265,009

[45] May 5, 1981

[54] DUCT ASSEMBLING TOOL

[76] Inventor: Glenn E. Mann, 10812 Highcliff Dr., Knoxville, Tenn. 37922

[21] Appl. No.: 972,477

[22] Filed: Dec. 22, 1978

[51] Int. Cl.$^3$ .............................................. B23P 19/04
[52] U.S. Cl. ....................................................... 29/244
[58] Field of Search ............................ 29/244; 254/95; 269/227

[56] References Cited

U.S. PATENT DOCUMENTS

| | | | |
|---|---|---|---|
| 1,008,694 | 11/1911 | Bryant | 254/95 |
| 1,472,538 | 10/1923 | Whalley | 254/95 |
| 1,894,556 | 1/1933 | Edlund | 81/3.42 |

*Primary Examiner*—James L. Jones, Jr.
*Attorney, Agent, or Firm*—Pitts & Kesterson

[57] ABSTRACT

A tool for assembling duct sections wherein a gear is rotatably attached to a housing and engages an apparatus with at least one rack. The tool has a pair of duct engaging clasps, at least one of which is integrally attached to the rack apparatus. The other duct engaging clasp may be attached to the housing or attached to a second rack which opposes the first. To assemble and join duct sections, one duct engaging clasp engages one section of duct and the other engages a second section of duct. The gear is then rotated such as to draw the duct engaging clasps together and thereby the duct sections for permanent fastening. After fastening, the gear is rotated in a direction so as to separate the duct engaging clasps. The duct engaging clasps are then disengaged.

4 Claims, 7 Drawing Figures

DUCT ASSEMBLING TOOL

BACKGROUND OF THE INVENTION

This invention relates to an assembling tool and more particularly to a tool which draws the ends of sections of duct together and holds them for permanent assembly.

Ducts are used in many applications to convey substances. One well known application is the use of ducts in air conditioning to transport air which has been heated or cooled. Such ducts as those used in air conditioning are generally rectangular in cross section and manufactured from sheet metal stock. Other shaped cross sections such as oval or circular are readily available and are used in other applications. Ducts are also made of various materials such as plastic, concrete and procelain to name a few.

Often ducting is used to convey substances over some distance. In many applications it is impractical or impossible to construct a continuous duct which has no seams or joints. For this reason ducting is generally manufactured in sections which are usually fitted either at the place of manufacture or at the place of assembly with various type flanges for permanently joining the sections. For example, the type of duct typically used in air conditioning applications has at least two of the sides of the rectangular cross section rolled over, curved or bent away from the opening toward the outside of the duct. This forms a type of flange which allows two adjoining ducts to be secured at the flanges by sheet metal screws or a clamp placed over two such flanges to hold the two adjoining ducts securely. Other types of ducts are supplied or fitted with a collar at the end of each duct section. This collar forms the flange. When two duct sections are to be fastened, bolts may be placed through holes in the flanges of each duct section after aligning and tightened to securely fasten them together.

Certain problems are presently encountered when installing and assembling the ducts or duct sections on the application site. The duct sections often needed for a particular application often come in sizes which are cumbersome and hard to maneuver, yet at the same time the ducts must be joined in an exacting fashion to prevent any leakage. In addition to size, the length, duct wall thickness and the material from which it is manufactured determines the weight of the duct section, and if substantial this weight can also create certain installation problems.

Presently the method of assembling two sections requires that they be placed in relatively close proximity to each other. Then by use of conventional tools such as hammers and manual labor, the sections may be forced or hammered into place by striking the flange thus pushing one section toward the other. This striking or forcing continues until the sections are aligned and in contact with each other. Then an appropriate fastener is applied to make a permanent assembly of the sections. The use of a hammer or other excessive force on a malleable material such as sheet metal may cause the flange and duct to become distorted thus preventing a proper seal between the sections. This then necessitates an on-site repair which causes waste in additional labor and material. Often the duct will be extensively damaged to the degree that an entire section must be replaced. In the case of concrete or porcelain ducts, the use of a hammer or other excessive force on such brittle material often causes them to break or shatter. This renders the duct section totally worthless and useless, and requires the replacement of the duct which again results in lost labor time and material.

Another problem encountered in the installation and assembling of duct sections by conventional methods is improper alignment. Generally when two sections are placed in proximate relation to each other for assembling, it is difficult to align them so that a fluid tight joint is made. Usually one of the sections must be moved or shifted by hammering, lifting or otherwise forcing it into proper alignment. Therefore, when aligning with conventional methods, damages similar to those above may be encountered.

A still further problem often encountered is that after two sections of duct are properly aligned and set, they will often shift or otherwise become misaligned if no axial force or pressure is maintained on the duct sections until a proper fastener is applied to the duct flanges. Often times because of duct placement or other difficulties it is hard to maintain sufficient axial pressure or force to insure proper alignment until a fastener is applied. This can cause a faulty or leaky joint which requires additional labor, time and materials to repair.

It is, therefore, an object of this invention to provide a tool which can draw the ends of two sections of duct together for joining without causing damage to the structural integrity of the duct or flange. It is a further object to provide a tool which will assist in aligning the ends of the two sections of duct in order that a fluid tight joint may be made. A further object is to provide a tool which will hold the ducts sections securely until a fastener can be attached for permanent assembling. Additionally it is an object to reduce the number of sections damaged by the use of presently available tools. A still further object is to provide a tool which is easily manufactured and assembled, and relatively inexpensive. Other objects and advantages will become apparent upon reading the following specifications and drawings, wherein:

In accordance with the various features of the invention a method and apparatus for assembling duct sections is provided. As will be discussed in detail hereinafter, the invention comprises means for engaging the sections of ducting to be assembled and a means for drawing the duct sections together. A gear is rotatably attached to a housing and engages an apparatus with at least one rack. The tool is equipped with a pair of duct engaging means, at least one of which is integrally attached to the rack apparatus. The other duct engaging means may be attached to a member which is fixedly attached to the housing or attached to a second rack which opposes the first. When duct sections are to be assembled, one duct engaging means engages with one duct section and the other engages a second section of duct. The gear is then rotated such as to draw the duct engaging means together and thereby the duct sections for permanent fastening. After fastening, the gear is rotated in a direction so as to separate the duct engaging means. The duct engaging means may now be disengaged and moved to the next joint where the operation is repeated.

Figure 1:
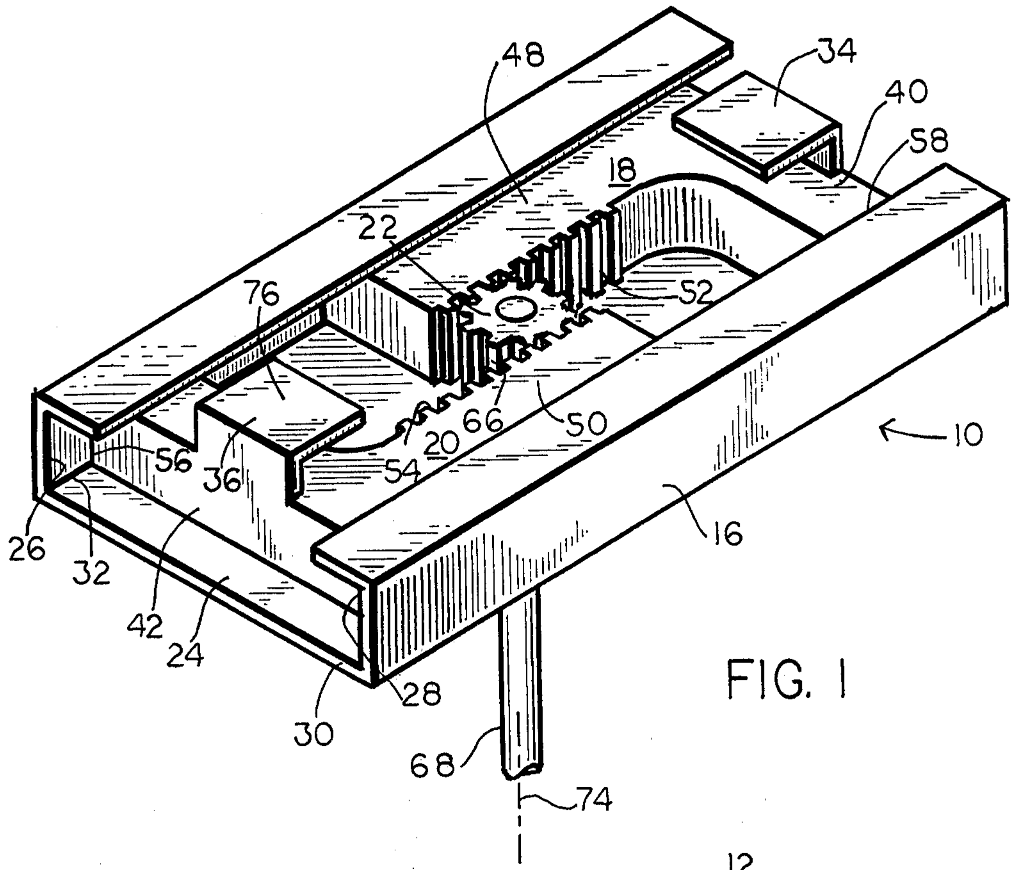
FIG. 1 is a perspective view of a first embodiment of the duct assembling tool constructed in accordance with the various features of the invention.
Figure 2:
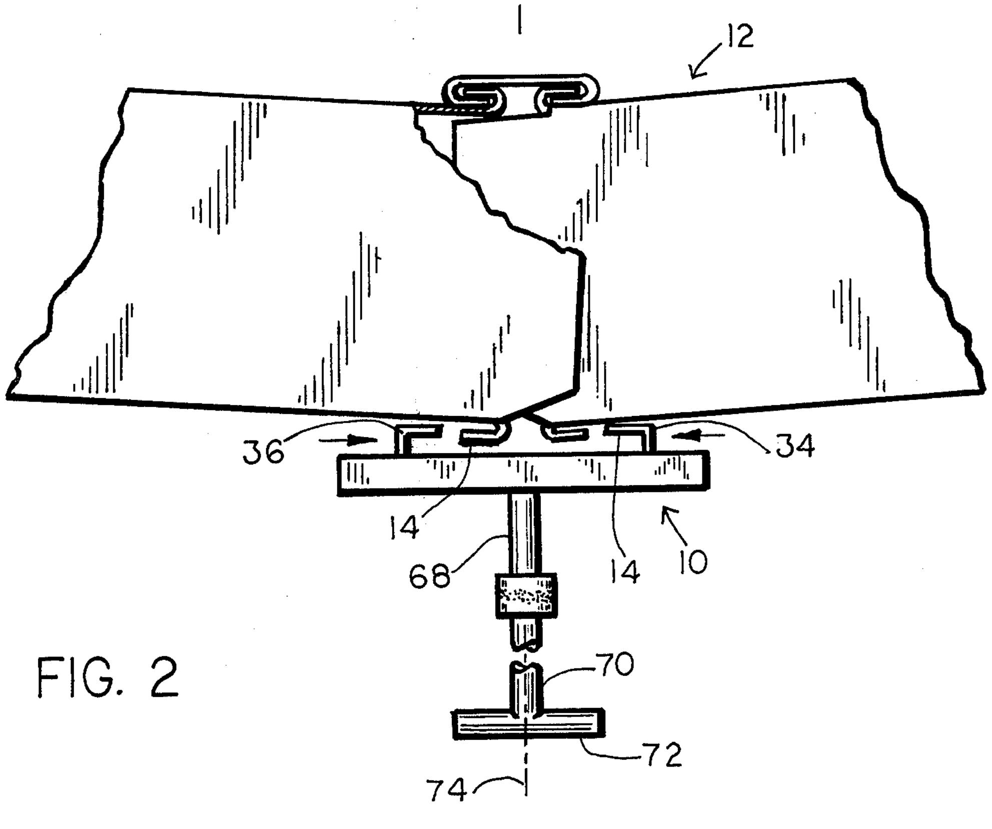
FIG. 2 is an elevation view of typical duct sections drawn together for permanent joining showing the duct assembling tool shown in FIG. 1 engaging a rolled flange on each duct section.

Referring now to the drawings, FIG. 1 illustrates a duct assembling tool generally designated 10 which is adapted for being used with conventional ducting, particularly ducting such as that shown at 12 in FIG. 2 and used in air conditioning, heating and other similar uses. To this end, ducting 12 as shown in FIG. 2 is usually equipped with a flange 14 such as an edge which is rolled over to form such. For convenience, and to aid in the understanding of this invention, similar elements of the various embodiments carry the same reference number.

Figure 3:
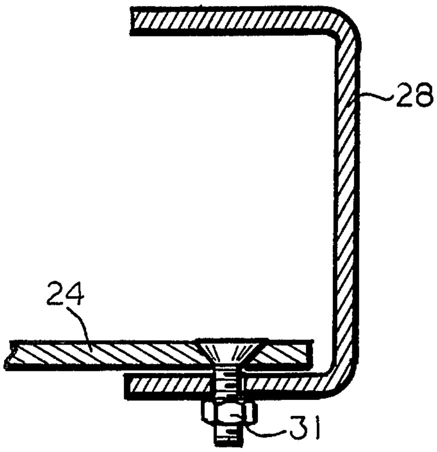
FIG. 3 is a sectional view of a typical channel attached to the housing plate of the apparatus as shown in FIG. 1 and FIG. 2.

A housing generally designated 16 provides a means for supporting carrier members 18 and 20 and gear 22 which operate together to pull duct sections together. In this regard a two-sided flat rectangular plate 24 is provided which is manufactured from a rigid material such as steel, plastic or other material. Channels 26 and 28 are attached to plate 24 and provide a means for holding and guiding carrier members 18 and 20. These channels 26 and 28 may be integrally formed as part of plate 24 or may be attached along two opposite and parallel edges 30 and 32 of the plate. Channel 26 and 28 may be formed at the time the plate is formed such as by extrusion or they could be attached by weld, bolts, or other suitable means. As an example, FIG. 3 illustrates how typical channel 28 is attached to plate 24 by means of a nut and bolt 31. It will be obvious to those skilled in the art that the cross-section of the channels 26 and 28 could have other configurations such as semi-circular, V-shaped or others, even though rectangular is illustrated.

Figure 4:
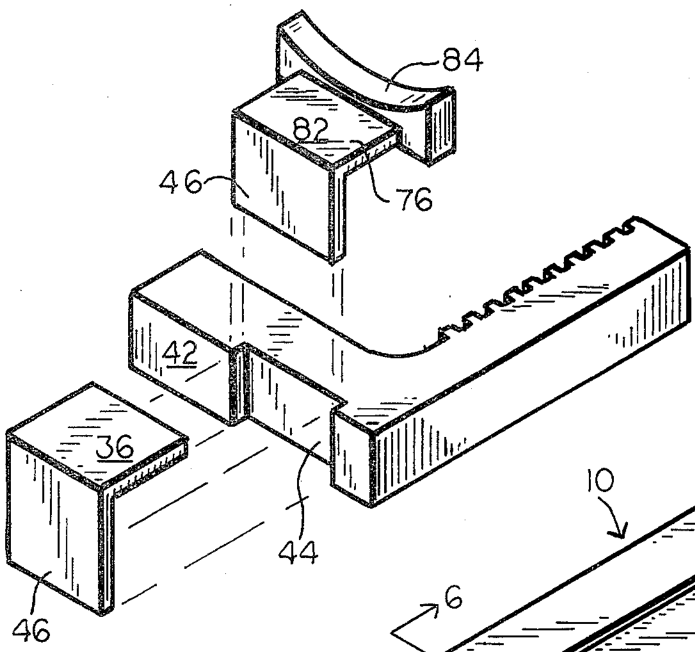
FIG. 4 is a typical hook carrier as shown in FIGS. 1, 5 and 7 and illustrates two interchangable duct engaging clasps for different shape ducts.

Means for releasably engaging the two sections of duct to be joined and assembled are provided. To this end, duct engaging clasps 34 and 36 are attached to carrier member 18 and carrier member 20 respectively. The clasps shown in FIG. 1 are L-shaped and are formed with a first end 38 which is adapted to engage a flange such as flange 14 in FIG. 2 on each section of duct 12. Clasps 34 and 36 are attached to a first leg 40 and 42 of each L-shaped carrier member 18 and 20 respectively. Such attachment may be permanent or may be demountably attached as shown in FIG. 4. In FIG. 4, there is shown a groove 44 for receiving end 46 of clasp 36. End 46 may be removably attached to clasp 36 at groove 46 by screws or nuts and bolts (not shown). Alternately, a slot may be formed in first leg 42 rather than a groove. This slot (not shown) is cut or formed such as to receive second end 46 of clasp 36. When second end 46 of clasp 36 is attached to groove 44, or inserted in a slot, the clasp is held firmly such as to allow little movement of clasp 36. The remaining legs 48 and 50 of the L-shaped carrier member 18 and 20, respectively are slidably disposed within channels 26 and 28. Integrally formed with legs 48 and 50 are gear racks 52 and 54. Carrier members 18 and 20 may be manufactured from any suitable rigid material, as for example, steel or plastic. When properly mounted within said housing, legs 48 and 50 of the carrier members slide within channels 26 and 28 with ends 56 and 58 of legs 40 and 42 slideably disposed within opposing channels 26 and 28.

Figure 5:
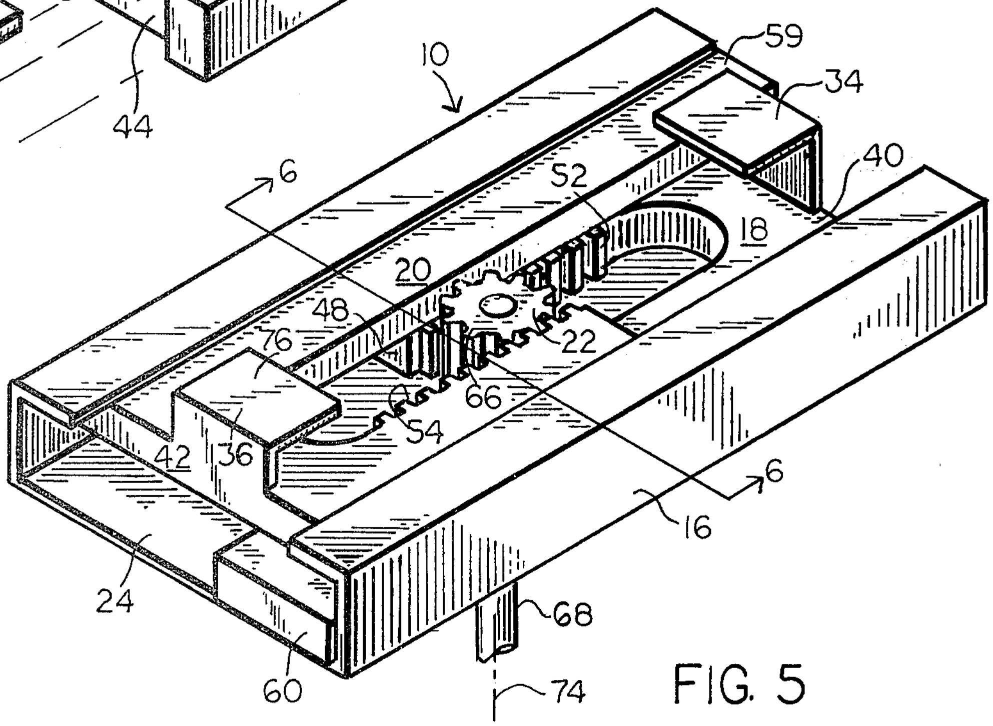
FIG. 5 is a perspective view of a second embodiment of the duct assembling tool constructed in accordance with the various features of this invention.
Figure 6:
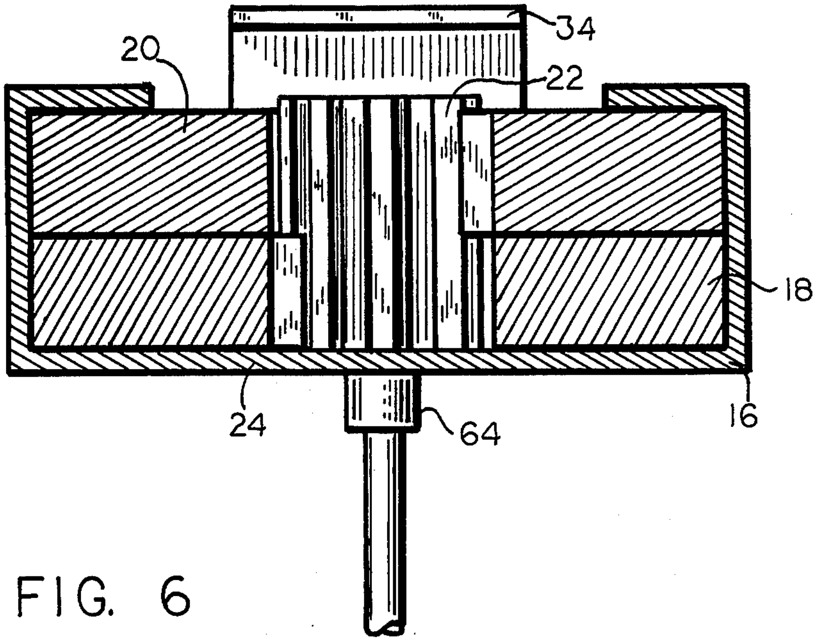
FIG. 6 is a cross-section view of the duct assembling tool of FIG. 5.

Referring now to FIGS. 5 and 6, there is shown another embodiment of this invention. This embodiment is similar to the embodiment discussed with respect to FIG. 1, except carrier members 18 and 20 are substantially "U" shaped such that carrier member 20 slides on top of carrier member 18. Therefore, leg 50 of carrier member 20 will not be directed into first leg 40 of carrier member 18. Likewise, of course, leg 48 of carrier member 18 will not be directed into first leg 42 of carrier member 50. Thus, it can be seen that clasps 34 and 36 can be brought closer together. In addition, because of the addition of leg 59 to carrier member 20, and leg 61 to carrier member 18, it will be appreciated that this embodiment has increased stability.

Referring now to FIG. 1, FIG. 5, and FIG. 6, means for imparting motion in one direction to one of the carrier members, and motion in the opposite direction for the other carrier member is provided. As shown, a gear 22 is rotatably attached to plate 24 of housing 16. Means are provided to prevent gear 22 from slipping out of its placement in a bore through plate 24 by a collar 64. This collar may be, for example, a nut. Gear teeth 66 of gear 22 mesh with racks 52 and 54 in such fashion that upon rotation of the gear 22, the racks travel in opposite directions.

A handle 68 is attached to gear 22 and provides a means to impart rotational motion to said gear. As shown in FIG. 2, end 70 is equipped with a means for grasping said handle by way of a cross member 72 attached to said end 70 as shown. In order to make the tool more useful in certain applications, a means for applying rotational force to the handle at a location other than in a direct line about the rotational axis 74 of said gear 60 may be provided. Such means could include a hinged joint or universal joint (not shown) 78 integrally formed with the handle 68 by conventional attaching or forming means. It will be appreciated that even though a universal joint is discussed, other means, such as a spring, could be substituted to provide the equivalent motion.

Figure 7:
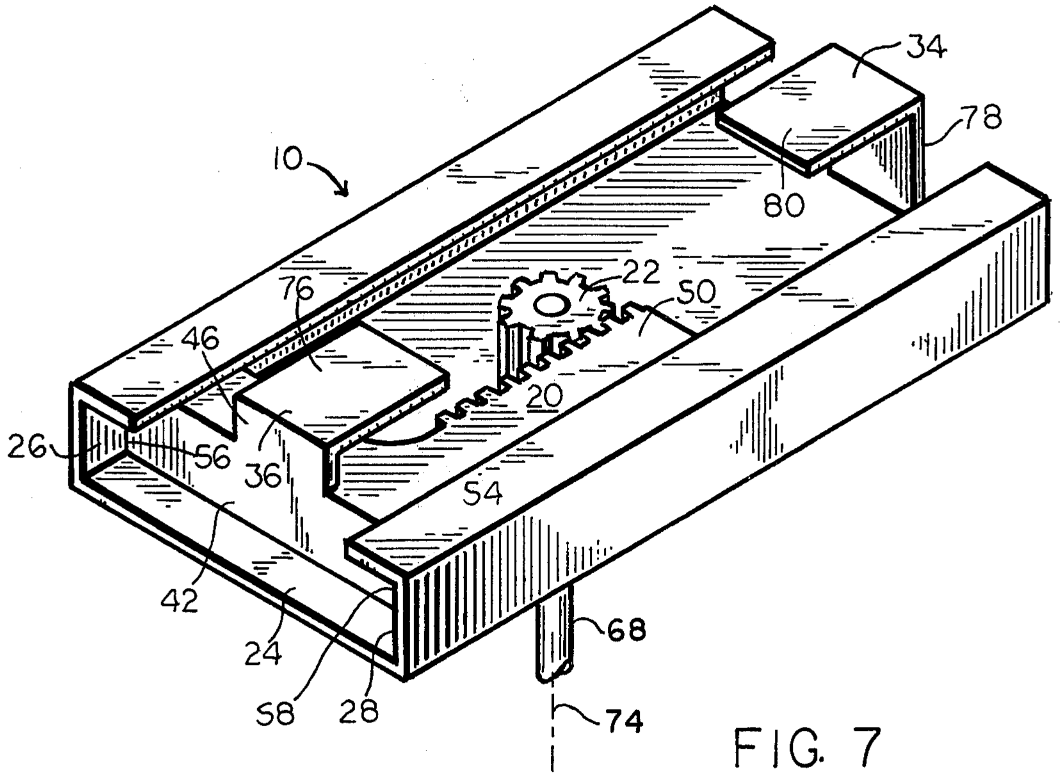
FIG. 7 is a perspective view of still another embodiment of the duct assembling tool constructed in accordance with the various features of this invention.

An alternate form of the invention is shown in FIG. 7 and generally designated as 100. Such alternate mode is similar to the first in that such tool contains a housing 16 with a flat plate 24 and channels 26 and 28 attached along two opposite sides of plate 24 as previously demonstrated. A carrier member 20 is shown as being L-shaped and having a first leg 42 and a second leg 50. Said second leg 50 is slidably disposed within channel 28 and has integrally formed therewith a rack 54. The first leg 42 of carrier member 20 has a first end 56 and a second end 58. The first end 56 of leg 42 is slidably disposed within channel 26 and the second end 58 of such leg 42 is slidably disposed within channel 28. A duct engaging clasp 36 is demountably attached or may be permanently attached by a first leg 46. A second leg 76 of said clasp 36 forms a blade which engages duct sections 12 in FIG. 2 at their flanges 14. On the side of housing 16 opposite leg 42 of carrier member 20 a second clasp 34 is permanently attached to said housing.

Clasp 34 is L-shaped and has a first leg 78 and a second leg 80. The first leg 78 is demountably attached or permanently attached to housing 16. The second leg 80 of clasp 34 is directed so as to oppose leg 76 of clasp 36. Leg 80 of clasp 34 is formed in such fashion as to be received by flange 14 of duct sections 12. Said clasp may be manufactured from any suitably rigid material as by example plastic or metal.

A means for imparting motion to carrier member 20 is provided. A gear 22 is rotatably attached to plate 24 of housing 16 and integrally engages rack 54 of said carrier member 2. The gear 22 is mounted in a fashion similar to the embodiment shown in FIG. 1 and FIG. 5. As gear 22 is rotated, carrier member 20 slides within channels 28 and 26 and carries clasp 36 toward and away from clasp 34 depending on the direction of rotation. The remaining portions of this particular embodiment are similar to those found in the first embodiment.

Duct cross sections may be various configurations including circular and rectangular. In order to accomodate these various duct configurations, means for clasping the duct sections for assembling are provided. As discussed earlier, one type of clasp is shown in FIG. 4 as clasp 36. This clasp 36 is designed to be used in conjunction with the type of duct shown in FIG. 2 and designated 12. A second type of duct clasp is shown at 82. This clasp is L-shaped with a first leg 46 and a second leg 76. Leg 46 is joined to carrier member 20. As illustrated in FIG. 4, leg 46 may be demountably attached within groove 44, or alternately in a slot (not shown) which is designed to receive said leg 46. Leg 46 of clasp 36 is designed to fit the same groove 44 or slot, and thereby allow clasp 36 and clasp 82 to be selectively interchanged. Leg 76 has attached thereto a semi-circular yoke 84 which is designed to clasp a circular cross-section pipe for assembling. Said yoke is designed to fit around the duct section behind the flange.

Therefore in order to assemble two sections of duct in fluid communication with each other, each duct engaging clasp, as for example clasps 34 and 36, engages flanges 14 of duct sections 12. A rotational force is imparted to the gear so that the clasps are drawn together and thereby drawing the duct sections together. When the duct sections are drawn together, they may be held by the tool until the ducts are permanently fastened and assembled, as by cleats, bolts or other suitable means. After fastening is complete, a rotational force is imparted to the gear causing the clasps to advance away from each other and thus the clasps may be disengaged from the duct sections. The tool may then be moved to the next joint to be formed where the same operation is repeated.

While the present invention has been disclosed with the preferred embodiment thereof, it should be understood that there may be other embodiments which fall within the spirit and scope of the invention as defined in the following claims.

What is claimed is:

1. A tool for assembling two duct sections, each duct section having at least one flanged end, said tool suitable for use with duct sections of any selected cross-section and comprising:

- a housing having a base plate with first and second parallel edges, and first and second channel members attached to said parallel edges such that said channel members are parallel and open inwardly and toward each other;
- a toothed gear rotatably attached to said base of said housing, and located substantially equal-distant between said first and second parallel channel members;
- first and second carrier members, each having a toothed rack portion and a clasp support portion at substantially a right angle with said rack portion, said first and second carrier member being supported by said housing such that each of said rack portions are controlled, one each, by said first and second channel members, and such that said toothed racks mesh with said rotatably toothed gear so that rotation of said tooth gear imparts motion to said first and second carrier members along a selected line of travel;
- first and second L-shaped clasps, having first and second legs, said first leg of each of said clasps being affixed to said clasp support portion of said first and second carrier members respectfully and said second leg of each of said clasps having a shape suitable for engaging said flanges of said duct sections, said first and second L-shaped clasps being attached to said carrier members such that said second legs are substantially parallel with said base of said housing and extend toward each other so that movement of said carrier member along said selected line of travel varies the distance between said first and second L-shaped clasps.

2. The tool of claim 1 wherein said first and second L-shaped clasps are selected from a multiplicity of first and second clasps each of said multiplicity having a selected shape suitable for engaging flanges of one of a multiplicity of different shaped duct sections.

3. The tool of claim 1 wherein said first leg of each of said clasps are removably affixed to said clasp support portions.

4. The tool of claims 1 or 2 wherein said second leg includes a yoke whereby said yoke at least partially surrounds the duct and presses against the flanges.

* * * * *